Nov. 14, 1944.　　W. W. RUSH ET AL　　2,362,722
BUTTER CUTTER
Filed July 8, 1942　　2 Sheets-Sheet 1

Inventor
William W. Rush
Gerard J. Maloney
Barthel & Bugbee
Attorney

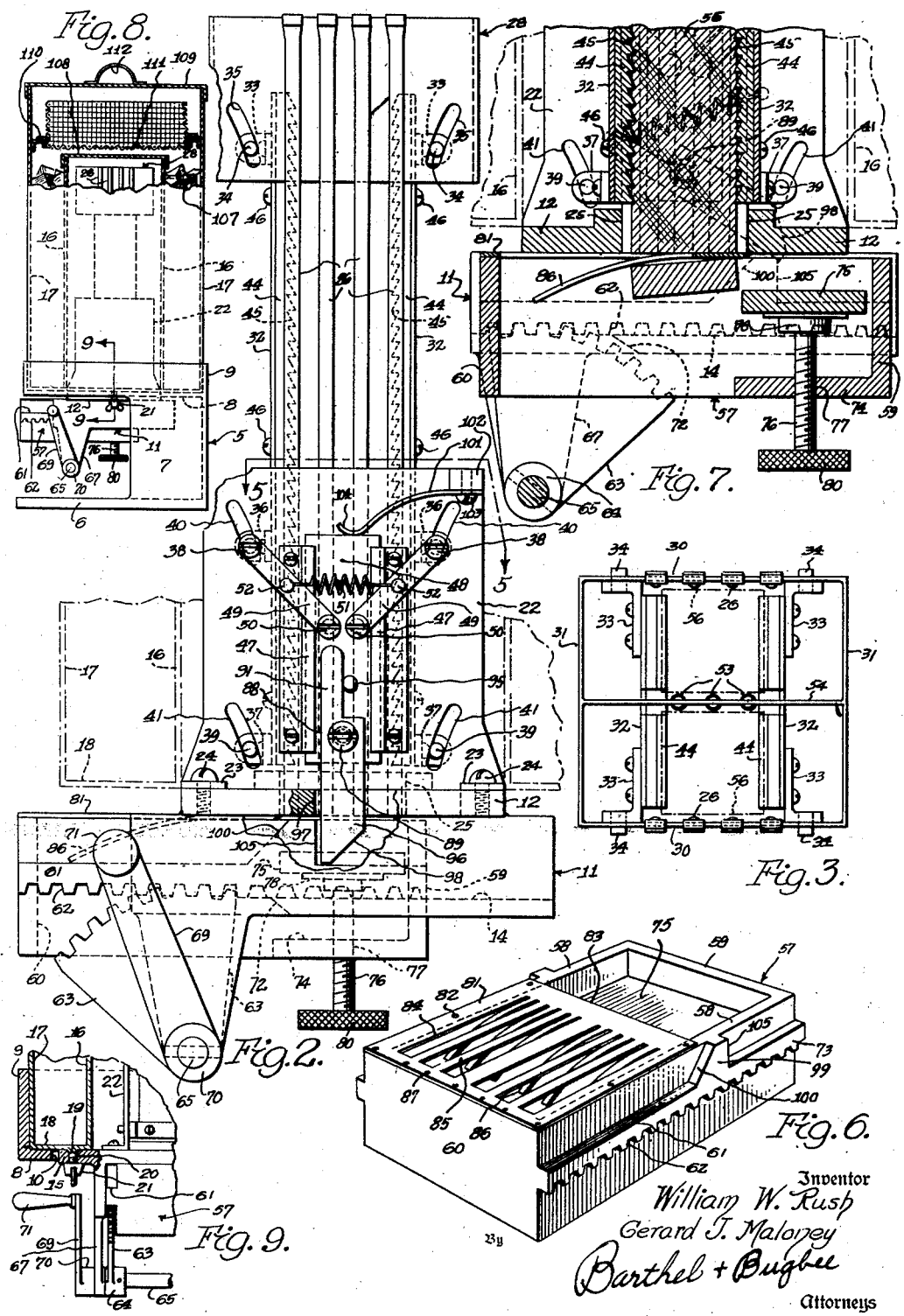

Patented Nov. 14, 1944

2,362,722

UNITED STATES PATENT OFFICE 2,362,722

BUTTER CUTTER

William W. Rush and Gerard Joseph Maloney, Inkster, Mich.

Application July 8, 1942, Serial No. 450,108

12 Claims. (Cl. 31—21)

The present invention relates to improvements in cutting apparatus and more particularly to a cutter for cutting butter into small individual servings.

The primary object of the invention is to provide a butter cutting device capable of being employed in restaurants and the like as well as domestic kitchens for accurately cutting butter into small individual servings or pats in a convenient, quick and sanitary manner without necessitating the handling of the butter during the cutting or slicing thereof.

Another object of the invention is to provide a butter cutting device as set forth in the preceding objects wherein means is provided for feeding the butter to the cutter in timed relation with the movement of the cutter so that the butter cake will be fed forward toward the cutter to expose a portion of said cake to be cut by the cutter upon the next stroke of said cutter.

Another object of the invention is to provide a butter cutting device having vertical guide means of reduced size for slidably supporting a cake of butter to facilitate the easy and smooth movement thereof to the cutting element when the butter is being dispensed.

Another object of the invention is to provide a butter cutting device of the above type in which adjustable stop means is provided for limiting the downward movement of the butter cake so that a plurality of individual butter pats of various uniform predetermined thickness may be cut in a minimum amount of time with very slight effort.

Another object of the invention is to provide a butter cutting mechanism having opposed feed plates frictionally engaging the butter cake to move downwardly and inwardly to feed the butter cake during reciprocation of the cutter in one direction and to move upwardly and outwardly during reciprocation of the cutting element in the opposite direction whereby the butter will be fed a predetermined distance prior to the cutting operation in order to insure the uniform and accurate cutting of the butter cake into individual serving pats.

Another object of the invention is to provide a butter cutting mechanism of the above mentioned type in which the cutting element is provided with a series of spring fingers rearwardly of the cutting edge to facilitate the removal of the individual serving pats from the cutting element after they have been cut thereby preventing the pats from sticking to the underside of cutting element or blade.

Other objects and advantages of the invention will become apparent during the course of the following description taken with the accompanying drawings, wherein Figure 1 is a fragmentary front elevational view of the butter cutter embodying the invention illustrating the guide and feed means above the reciprocable cutter.

Figure 2 is a fragmentary side elevational view of the guide means and cutter illustrating in detail the feed means operating mechanism.

Figure 3 is a top plan view of the butter guide showing in detail the manner in which the frame bars are connected.

Figure 6 is a perspective view of the cutter carrying slide illustrating the same detached from the feed mechanism supporting frame.

Figure 7 is a fragmentary vertical sectional view similar to Figure 4 showing the manner in which the cutting member is operated to sever an individual butter pat serving.

Figure 8 is a side elevational view of the butter cutting apparatus illustrating a portion of the casing broken away to show various details of construction, and Figure 9 is a fragmentary vertical cross sectional view taken on lines 9—9 of Figure 8, looking in the direction of the arrows, showing the detachable connection for securing the frame structure in position.

Figures 1, 4, 5:
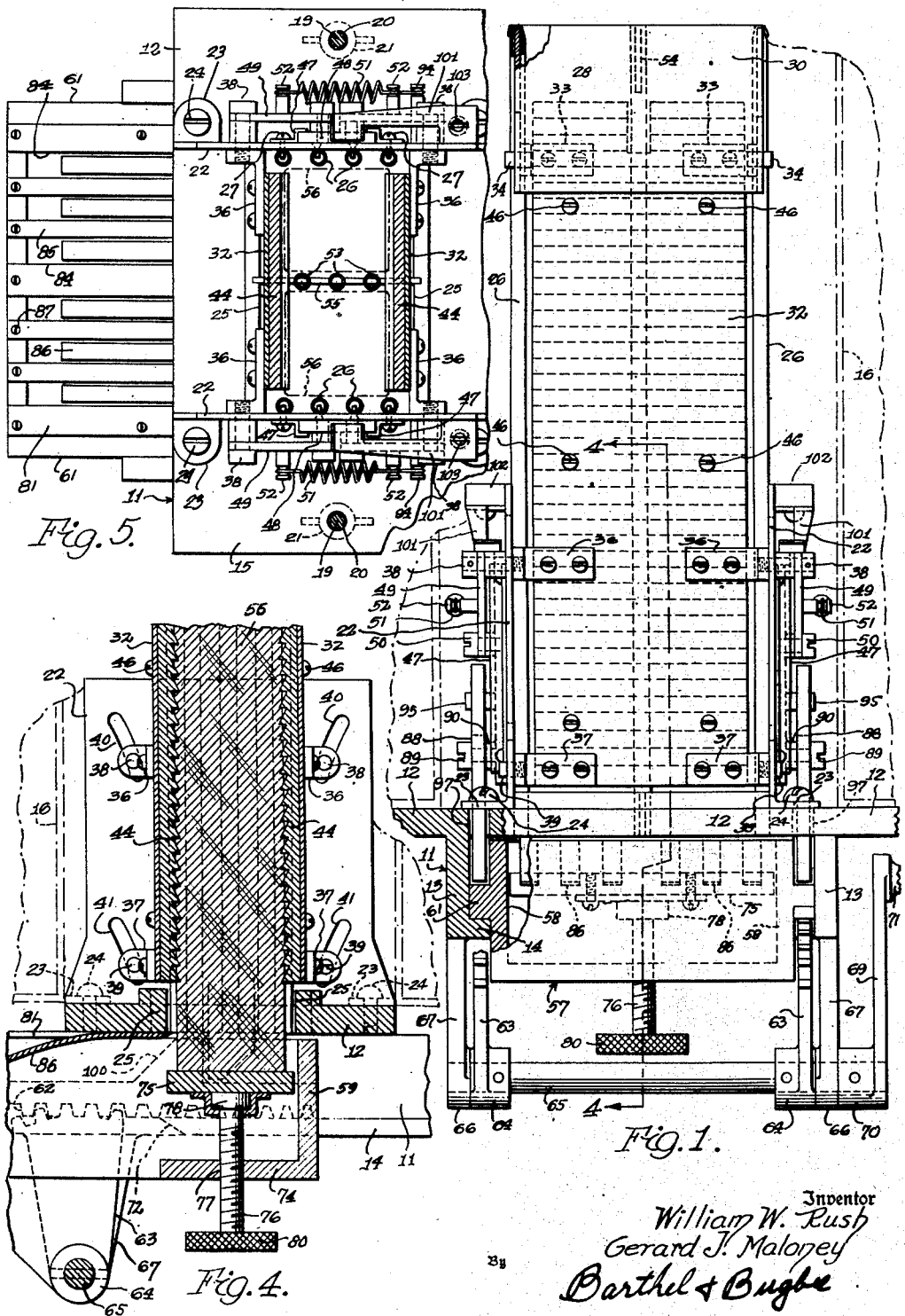
Figure 4 is a fragmentary vertical cross-sectional view taken on lines 4—4 of Figure 1 looking in the direction of the arrows illustrating the manner in which the feed plates are adapted to frictionally grip the butter cake to feed the same into position to be cut.
Figure 5 is a fragmentary horizontal cross-sectional view taken on lines 5—5 of Figure 2 looking in the direction of the arrows illustrating the various structural parts of the guide and feed means in detail.

In the drawings, wherein for the purpose of illustrating the invention and wherein like reference characters will be employed to designate like parts throughout the same, the reference character 5 will generally be employed to designate a base for the butter cutter apparatus formed from a casting having a foot portion 6 and an upstanding wall 7 extending from the edge of the foot portion on three sides of the base. The upper portion of the wall 7 connects with a plate-like support 8 around which is formed an upstanding marginal flange 9. Formed in the support 8 and centrally thereof is a rectangular opening 10 (Figure 9) for receiving a rectangular casting generally indicated by the reference numeral 11.

The casting 11 includes a top wall 12 having spaced depending side walls 13 inturned as at 14 to provide opposed flanges forming a slide way for the cutter element. The casting 11 is supported from the plate-like support 8 as shown in Figure 9. The top wall 12 of the casting is provided with a pair of oppositely directed ears or lugs 15 which extend into cut-away portions of the opening 16. Supported on the wall 8 of the base 5 is a rectangular container having spaced walls 16 and 17 connected at their lower ends by bottom wall 18 which is adapted to rest upon the support 8 so that said bottom wall 18 may be provided with screws 19 depending therefrom at opposed points to extend into suitable openings 20 in the extensions or wings 15 of the rectangular casting 11. A wing nut 21 is threaded on each depending bolt 19 to anchor the rectangular casting in position (Figs. 8 and 9).

Secured to the top wall 12 of the rectangular casting 11 is a pair of vertical guide plates 22 and said guide plates are provided with ears or lugs 23 through which are passed bolts or other fastening elements 24 to securely hold the plates in position. The guide plates 22 are mounted at each end of an elongated slot 25 formed in the top wall 12 of the box-like casting 11 and it is to be noted that the side walls of the opening 25 are inclined inwardly and downwardly to provide a guide for the ends of the butter cake.

Extending upwardly and secured to the guide plates 22 is a series of vertical guide bars 26 the lower ends of which are fastened to the plates 22 by means of screws or the like 27 while the upper ends are slotted for receiving the side walls of a casing 28 where they may be welded or otherwise fastened in place and the extreme upper ends of the bars 26 are bent upon themselves over the upper edge of the frame 28 to securely retain the same in position. The frame 28 is of box-like formation and comprises side walls 30 and end walls 31 and if desired, the upper ends of the bars 26 may be fastened to the side walls 30 of the frame 28 as by means of welding, soldering or the like.

Slidably supported between the guide plates 22 and between the side walls 30 of the frame 28 is a pair of opposed feed bars 32 having a pair of brackets 33 secured to the upper ends thereof for receiving a guide rod 34. Each of the guide rods 34 is adapted to be slidably guided in downwardly inclined slots or guideways 35 formed in the side wall 30 of the frame 28. The lower end of each of the feed bars 32 is supported in a similar manner between the guide plates 22 and spaced brackets 36 and 37 are fastened to the feed plates for accommodating guide screws 38 and guide rods 39 respectively. The guide screws 38 are adapted to operate in downwardly and inwardly directed guide slots 40 formed in the guide plates 22 and the guide rods 39 operate in similar inwardly and downwardly inclined guide slots 41. It will thus be seen that upward movement of the guide pins 34, 38 and 39 will cause the feed plates 32 to be moved upwardly and outwardly from engagement with the cakes or series of cakes of butter and it is to be noted that each of the feed plates 32 has its opposed face provided with a friction strip 44 having teeth 45 inclined downwardly to frictionally grip the butter for feeding the same toward the opening 25 to allow the plates 32 to be moved upwardly without moving the butter during the return stroke. The structure above described including the guide bars 26 and feed plates 32 define a chute into which butter may be fed downwardly through the dispensing opening 25. Screws 46 are spaced along the feed plates 32 for anchoring the friction bars 44 in place (Figs. 2 and 4).

Mounted on the guide plates 22, in spaced relation, is a pair of flanged plates 47 providing a guideway for a reciprocating actuator block 48 and each of said actuator blocks 48 is connected to the guide screws 38 by means of connecting links 49. Screws 50 extend through the opposite ends of the links 49 to pivotally fasten the same to the blocks. A coil spring 51 has its ends connected to each pair of links 49 by being hooked over fastening pins or the like 52 to normally urge said links 49 inwardly resulting in the downward movement of the feed bars 32.

Mounted between the vertical guide bars 26 of the chute is a series of similar guide bars 53 which are supported between the end walls 31 at their upper ends by means of a transverse strip 54. The lower ends of the guide bars 53 are supported in a similar manner by means of a transverse strip 55 (Figs. 1 and 5). The outer guide bars 26 and intermediate guide bars 53 provide a divided chute for feeding blocks or cakes of butter 56 which are of the so-called one quarter pound type generally known as "sticks."

Reciprocably mounted between the depending walls 13 of the rectangular casing 12 is a box-like casting 57 having side walls 58 connected at each end by end walls 59 and 60. The side walls 58 are provided with guide ribs 61 which are adapted to be slidably guided on the inturned flanges 14 of the rectangular casting 10. The under side of each guide rib 61 is provided with rack-teeth 62 which are adapted to be engaged by segmental gears 63 the hubs of which as at 64 are keyed or otherwise secured to a transverse shaft 65. The shaft 65 is supported in bearing portions 66 formed on the lower ends of depending brackets 67 integrally connected with the depending side walls 13 of the rectangular casting 10. A hand crank 69 is provided with a hub portion 70 which is similarly keyed or locked to the shaft 65 for rotation therewith and said hand crank is provided with a handle 71 to facilitate rotation of the shaft 65 and thereby impart reciprocatory motion to the box-like casting 57. A portion of the flanges 14 is cut away as at 72 to allow the segmental gear 63 to project therethrough and engage the teeth of the rack bar as at 62. Additional guide projections 73 are formed on the side walls 58 of the box-like casting 57 and said guide lugs 73 are aligned with the guide ribs 61 to rest upon the flanges 14 and provide an additional support for the box-like casting 57.

One end of the box-like casting 57 is provided with a partial floor 74 connecting the side walls 58 and the end wall 59 so as to provide a chamber for receiving a thickness gauge plate 75 mounted on the upper end of a screw shaft 76 threaded in a suitable opening 77 in the floor 74. The thickness guide plate 75 is rotatably connected with the threaded shaft 76 by means of a rotatable connection 78. A knurled thumb engaging portion 80 is provided on the opposite end of the screw-threaded shaft 76 to facilitate the raising and lowering of the thickness gauge plate 75.

Secured to the box-like casting 57, to the upper edges of the side walls 58 thereof, is a cutter plate 81 fastened in place by screws or the like 82 and said cutter plate extends a portion of the length of the box-like casting 57 and terminates centrally thereof directly above the thickness gauge plate 75 in a knife edge 83. The knife edge 83 is adapted to traverse the bottom wall of the casting plate 12 so as to move to and fro over the opening 25 and thereby sever the butter cake 56 as it is fed downward to the thickness determining gauge 75. The cutter plate 81 is slotted as at 84 to provide alternate strips 85 and 86 as clearly shown in Fig. 6. The strips 85 are connected at their ends by the edge portion of the plate 81, and said plate portion is secured to the end wall 60 of the box-like casting 57 by means of screws or the like 87. The alternate strips 86 are shortened in length and are curved downwardly to form stripper spring arms for removing the butter pats from the cutter plate 81 after they have been severed by the cutting edge 83.

Pivotally mounted on the slide blocks 48 is a trip lever 88 secured in place by a pivot screw 89 and spaced from each block 48 by a spacing washer 90. A stop pin 95 is secured to the slide block 48 adjacent the lower end thereof to engage the upper portion of the trip lever 91 and limit movement thereof in one direction. The lower portion of the trip lever as at 96 projects through an elongated slot 97 in the top wall 12 of the rectangular casting 11 so as to project therebelow between the depending walls 13 as shown in Figs. 1 and 2. The lower ends 96 of the trip levers terminate a short distance above the guide ribs 64 and are provided with angular cam faces 98 adapted to be engaged by cam blocks 99 formed integral with the side walls 58 of the box-like casting 57. The cam projections 99 are cut away to provide cam faces 100 adapted to cooperate with the cam faces 98 when the box-like casting 57 is moved to the left thereby raising the guide blocks 48 and moving the feed bars 32 upwardly and outwardly for reengaging and feeding the butter blocks 56. Each of the side guide plates 22 is provided with a spring arm 101 having one end fastened to a lug 102 by means of a screw 103 while the opposite curved end 104 is presented to the upper end of the slide block 48 to normally urge the same downwardly into the position shown in Figs. 1 and 2. When the box-like casting 57 is moved to its return position to the right the vertical edge 105 of the cam projection 99 engages the lower end of the trip lever 96 and swings the same about the pivot screw 89 without elevating the slide blocks 48 and feed bars 32. During this movement, the butter is cut and when the box-like casting 57 is returned to the position shown in Fig. 4, the feed plates 32 will have moved upwardly and downwardly to cause the lower portion of the butter blocks 56 to engage the thickness gauge plate 75 which has been adjusted to cut a butter pat of a predetermined thickness. When the box-like casting 57 is again moved to the right, the cutter severs the projecting portion of the butter block and upon continued travel causes the thickness gauge plate 75 to move from therebeneath with the result that the stripper arms 86 remove the butter pat as shown in Fig. 7 so that it may fall downwardly between the side walls 58 of the box-like casting forwardly of the partial floor 74 and be dispensed onto a plate or the like positioned on the foot 6 of the base 5.

In order to properly cool the butter, ice or other cooling medium 107 may be inserted between the walls 16 and 17 so that the butter cakes 56 may be kept at the proper temperature. A cover 108 is provided for the inner container walls 16 and a cover 109 is provided for the outer container walls 17. An angular bracket 110 is mounted adjacent the upper end of the outer container walls 17 for supporting a wire basket or the like 111 in which may be placed cakes of butter for storage purposes. The cover 109 may be provided with a handle 112 to facilitate the easy removal thereof when storing butter in the basket 111 or when replenishing the butter cakes 56 in the chute defined by the guide strips 26, 53 and the feeder plates 32 and 44.

In operation, the handle 71 is grasped to reciprocate the box-like casting 57 after the chutes have been filled with butter so that as many individual butter pats may be cut as desired without necessitating the handling of the butter or other contamination thereof by exposing the same to handling and foreign matter. Butter pats of various thicknesses may be cut by simply adjusting the knurled thumb-piece 80. By manipulating the handpiece or crank 71 to cause the reciprocation of the box-like casting 57 to and fro, the butter is cut and the feeder plates 32 are moved upwardly and downwardly by the cooperation of the cam projections 105 and cam faces 98 of the trip levers 88. Also, the thickness gauge plate 75 moves under and away from the projecting end of the butter block 56 during the reciprocation of the box-like casting in its to and fro movement.

While a specific embodiment of the invention has been described and illustrated, it will be understood that various modifications may be made within the scope of the appended claims without departing from the spirit of the invention.

What I claim is:

1. A butter cutter comprising a feed chute adapted to receive butter blocks, means for frictionally gripping and intermittently feeding the butter to a dispensing opening and means for severing the butter into individual servings of predetermined thickness as it passes through said dispensing opening in timed relation with the intermittent feeding means.

2. A butter cutter comprising a feed chute adapted to receive sticks of butter, a movable cutter member associated with the chute to sever the butter into individual butter serving pats, and intermittent feed means controlled by said movable cutter member for frictionally gripping and advancing the butter sticks in said chute toward said movable cutter member in timed relation to the movement thereof.

3. A butter cutter comprising a feed chute adapted to receive blocks of butter to dispense a portion of said butter a predetermined distance beyond said chute, a cutter element reciprocably mounted adjacent said chute to sever the butter dispensed into individual pats and intermittent feed means controlled by the reciprocation of said cutter to frictionally grip and feed said butter blocks to said cutter.

4. A butter cutter comprising a feed chute adapted to receive sticks of butter to dispense a portion of said butter a predetermined distance beyond said chute, a cutter element reciprocably mounted adjacent said chute to sever the butter dispensed into individual butter pats, a plurality of stripper fingers carried by said cutter element to remove the individual butter pats from said cutter element after being severed from the predetermined dispensed portion and feed mechanism controlled by the movement of said cutter element for feeding the sticks of butter in the chute intermittently in timed sequence toward said cutter element.

5. A butter cutter comprising a base, a feed chute carried by said base to receive sticks of butter, said chute having a dispensing opening above the base to allow the projection of predetermined quantities of butter through said opening, a reciprocable cutter slidably mounted on said base adjacent said dispensing opening, feed means for gripping and advancing the butter in timed sequence to the reciprocable movement of the cutter, and a chamber supported by said base surrounding the feed chute adapted to contain a refrigerant to maintain the butter sticks at a predetermined temperature.

6. A butter cutter comprising a base, a casting carried by the base having slideways on the underside thereof, a vertical feed chute supported by said casting adapted to receive butter, a reciprocable cutter mounted to slide in said slideways to sever the butter into individual servings, a pair of feed plates adapted to frictionally engage the butter to feed the same toward the reciprocable cutter, cam projections mounted on said reciprocable cutter to move the feed plates upwardly and away from said butter and spring means for urging said feed plates inwardly into engagement with said butter and downwardly toward the reciprocable cutter.

7. A butter cutter comprising a base, a casting carried by the base having slideways on the underside thereof, a vertical feed chute supported by said casting adapted to receive butter, a reciprocable cutter mounted to slide in said slideways to sever the butter into individual servings, a pair of feed plates adapted to frictionally engage the butter to feed the same toward the reciprocable cutter, cam projections mounted on said reciprocable cutter to move the feed plates upwardly and away from said butter, spring means for urging said feed plates inwardly into engagement with said butter and downwardly toward the reciprocable cutter and a refrigerating casing surrounding the feed chute and supported on said base.

8. A butter cutter comprising a base having a dispensing opening and a slideway, a series of guide rods extending upwardly from said base providing a butter receiving feed chute, a cutter slidably mounted in said base beneath the dispensing opening and a pair of opposed feed plates supported by said feed chute to feed the butter toward said cutter, said feed plates being moved upwardly and downwardly in timed relation to the movement of the slidably mounted cutter and operated thereby.

9. A butter cutter comprising a feed chute adapted to receive sticks of butter, a movable cutter element mounted adjacent said feed chute to sever the sticks of butter into individual butter pats, and an intermittent feed mechanism controlled by the movement of the cutter to frictionally grip and feed the sticks of butter a predetermined distance to form butter pats of uniform thickness, said intermittent feed mechanism being operated during the return movement of the cutter element to a position to frictionally grip and advance the butter sticks for severance upon the cutting stroke of said movable cutter element.

10. A butter cutter comprising a feed chute adapted to receive blocks of butter to dispense a portion of said blocks of butter a predetermined distance beyond said chute, a movable cutter member associated with said chute to sever the butter dispensed into individual butter pats, and feed mechanism for frictionally gripping and intermittently feeding said butter blocks to said movable cutter member in timed relation with the movement of said movable cutter member whereby said blocks of butter will be divided into pats of uniform thickness.

11. A butter cutter comprising a feed chute adapted to receive sticks of butter to dispense a portion of said butter a predetermined distance beyond said chute, a movable cutter element reciprocably mounted adjacent said chute to sever the butter dispensed into individual pats, stripper means carried by the movable cutter element for removing the individual butter pats after being cut, and intermittent feed means controlled by the reciprocation of said movable cutter element to frictionally grip and feed said butter sticks to said cutter element intermittently and in timed relation with the movement of said cutter element.

12. A butter cutter comprising a base, having a dispensing opening with tapered walls, a feed chute carried by said base to receive the butter to be fed toward said tapered walls of said opening in the base, means for intermittently gripping and feeding said butter to said dispensing opening in said chute, cutter means disposed below said opening for severing said butter to form individual butter pats, said cutter means being operatively connected to said feed means to control the same in timed relation upon movement of the cutter means in one direction, and a casing arranged below said base for supporting said cutter means.

WILLIAM W. RUSH.
GERARD J. MALONEY.